United States Patent [19]

Yamamoto

[11] Patent Number: 4,636,848
[45] Date of Patent: Jan. 13, 1987

[54] DOCUMENT INFORMATION FILING SYSTEM WITH A SINGLE DISPLAY DEVICE

[75] Inventor: Kazuhiko Yamamoto, Yokosuka, Japan

[73] Assignee: Tokyo Shibaura Denki Kabushiki Kaisha, Kawasaki, Japan

[21] Appl. No.: 582,851

[22] Filed: Feb. 23, 1984

Related U.S. Application Data

[63] Continuation of Ser. No. 316,483, Oct. 29, 1981, abandoned.

[30] Foreign Application Priority Data

Oct. 31, 1980 [JP] Japan .................... 55-153265
Oct. 31, 1980 [JP] Japan .................... 55-153267

[51] Int. Cl.⁴ .................................. H04N 7/18
[52] U.S. Cl. ........................... 358/102; 358/183; 358/903
[58] Field of Search ............ 358/102, 256, 903, 183; 340/734

[56] References Cited

U.S. PATENT DOCUMENTS

| | | | |
|---|---|---|---|
| 2,721,990 | 10/1955 | McNaney | 358/102 |
| 3,757,037 | 9/1973 | Bialek | 358/102 |
| 4,013,876 | 3/1977 | Austin | 358/186 |
| 4,205,780 | 6/1980 | Burns et al. | 235/471 |
| 4,324,484 | 4/1982 | Johnson | 355/16 |
| 4,437,127 | 3/1984 | Hirose | 358/257 |

FOREIGN PATENT DOCUMENTS 2363347 7/1974 Fed. Rep. of Germany .

OTHER PUBLICATIONS

Johnson–Document Location with Convenient Keyboard–IBM Tech. Disclosure Bulletin, vol. 9, #2, Jul. 1966, pp. 146, 147.
Toshiba–Tosfile 1000–Oct. 1980.
Toshiba–Tosfile 2100–Jan. 1983.
Howe et al.–Document Storage on a Video Disc–Research Disclosure No. 186, Oct. 1979, pp. 568–570.

Primary Examiner—Joseph A. Orsino, Jr.
Attorney, Agent, or Firm—Cushman, Darby and Cushman

[57] ABSTRACT

There is disclosed a document information filing system which displays the title information and the picture information by means of single display device comprised of a cathode-ray tube. A two-dimensional scanning device is provided for optically scanning a document to be filed to produce picture information corresponding to the document. The picture information produced by the scanner is magnetically recorded on a magnetic tape of an information custody device together with a retrieval information corresponding to the picture information and comprised of a plurality of code groups. When a proper code constituting the retrieval information is set by a keyboard, the title information including this code is selected from the information custody device. On the basis of the title information, desired document picture information is retrieved and extracted. The retrieval code of the title information and the desired document picture information are selectively transmitted to a cathode-ray display by way of a gate circuit.

14 Claims, 11 Drawing Figures

F I G. 2
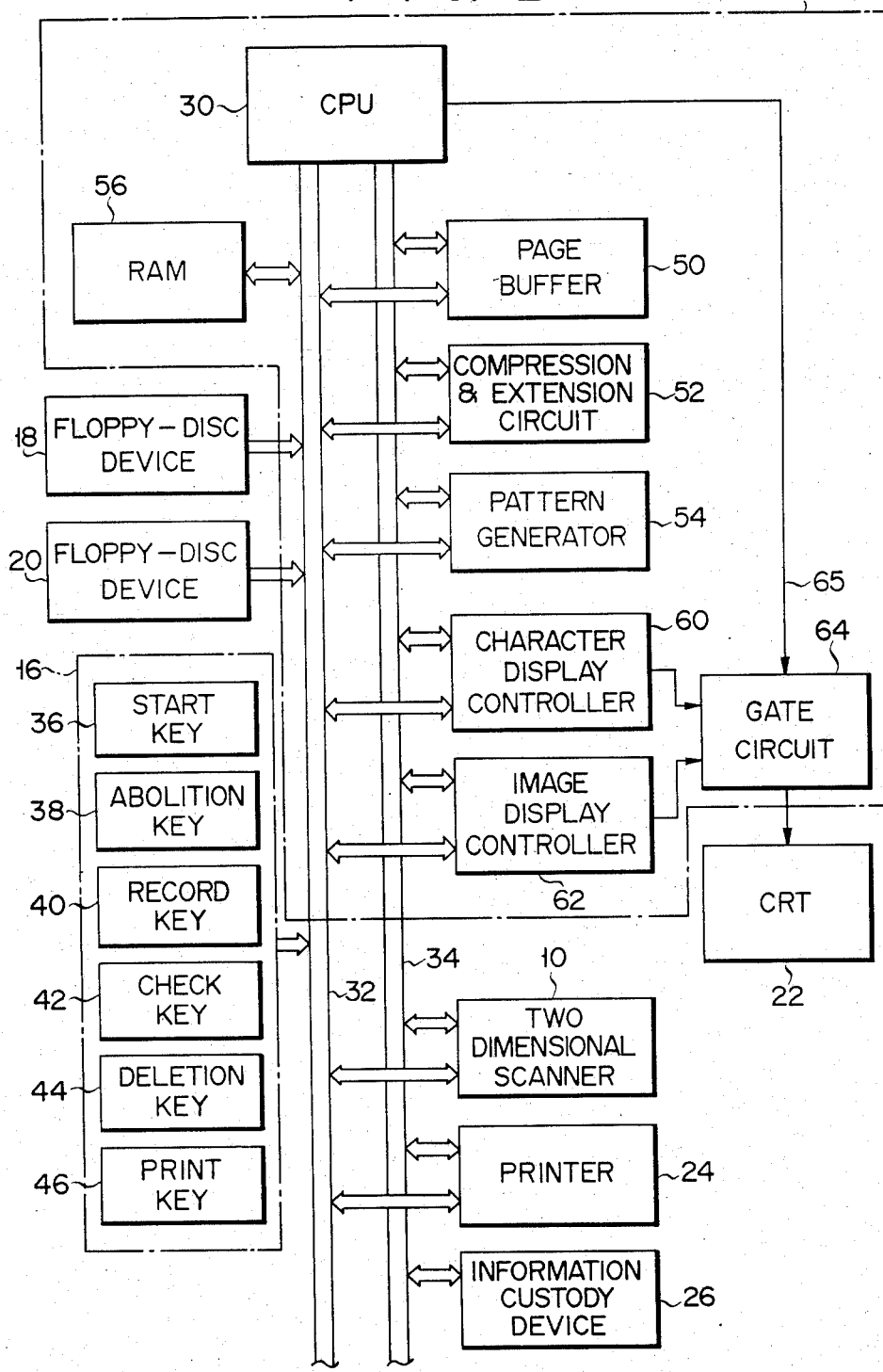

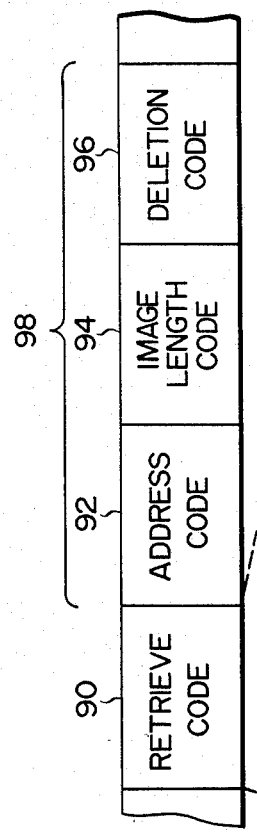
F I G. 5A
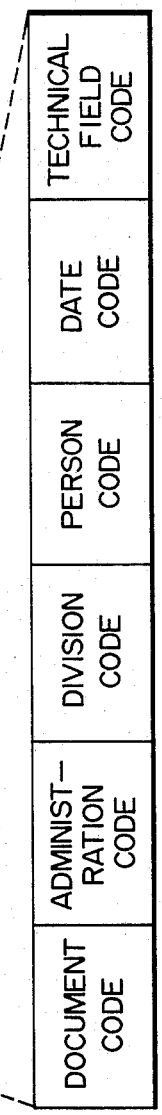
F I G. 5B
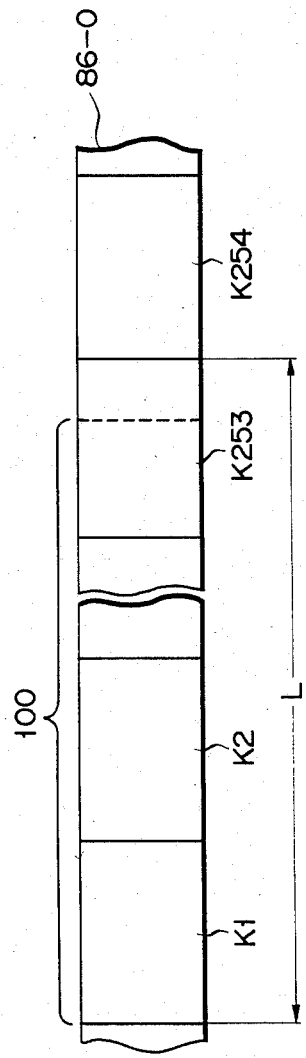
F I G. 6

FIG. 8

* RETRIEVAL CONDITION

KIND OF DOCUMENT : RESEARCH PAPER

TECHNICAL FIELD : SOLID STATE PHYSICS

* * * * ***

* PERTINENT DOCUMENT(S)

| NO. | DIVISION | PERSON | DATE |
|---|---|---|---|
| 003 | APPLICATION LABORATORY | T. YAMADA | APR. 15, 1959 |
| 014 | SEMICONDUCTOR DIV. | K. YAMAMOTO | SEP. 21, 1972 |
| --- | --- | --- | --- |
| 205 | ELECTRONIC COMMUNICATION DIV. | J. SMITH | AUG. 07, 1980 |

FIG. 10

* RETRIEVAL CONDITION

KIND OF DOCUMENT : <u>RESEARCH PAPER</u>

TECHNICAL FIELD : <u>SOLID STATE PHYSICS</u>

* PERTINENT DOCUMENT(S)

| NO. | DIVISION | PERSON | DATE |
|---|---|---|---|
| 003 | APPLICATION LABORATORY | TARO YAMADA | 4/15, 1959 |
| 014 | SEMICONDUCTOR DIV. | KAZUO ITO | 9/21, 1972 |
| --- | --- | --- | --- |
| 205 | ELECTRONIC COM. DIV. | JOHN SMITH | 8/07, 1980 |

DOCUMENT INFORMATION FILING SYSTEM WITH A SINGLE DISPLAY DEVICE

This is a continuation of application Ser. No. 316,483, filed Oct. 29, 1981, now abandoned.

BACKGROUND OF THE INVENTION

The present invention relates to a document filing system which stores electrical signals representing picture information such as documents and, when desired, retrieves desired picture information to display and/or print the same.

A filing system for recording original document information on a microfilm in a size-reduction manner widely used for storing an enormous amount of the document information produced in companies and offices to provide space-saving and easy retrieval manner. The microfilm filing system has succeeded in greatly saving the space for keeping the document information, but has a problem in providing quick and effectively retrieving and sampling of desired information from the mass of information stored on microfilm.

An electronic document information filing system has been developed, superseding the microfilm filing system. The filing system two-dimensionally laser beam scans an original document to be filed, forms electrical image signals representing the scanned document contents by means of, for example, a charge coupled device (CCD), and records the image signals into a recording medium with a high recording density. In this type of the filing system, filing information corresponding to every picture information, called "title information" are stored. The title information includes index information representing locations on a recording medium where the picture information are stored and further retrieval codes generally representing the picture information. When a desired retrieval code is keyed in from an input section including a keyboard, the document picture information correspoding the title information containing the retrieval code are retrieved and extracted, and finally are displayed on a display device. When the document contents extracted is desired to be printed, a corresponding key is depressed to print out the document contents extracted in the form of a called hard copy.

The known filing system, however, needs two display devices for displaying the title information and the picture information corresponding to the title information; a first display device exclusively used for displaying the title information and a second display device for exclusively displaying the picture information. This results in a complicated construction and an increased manufacturing cost.

SUMMARY OF THE INVENTION

Accordingly, an object of the present invention is to provide an simple document information filing system which can display the filing information and the picture information by a single display device, in an easy-to-see manner.

A document information filing system according to the present invention is provided with a scanning means which optically scans a document to be filed to produce picture information corresponding to the document. At least one piece of the picture information produced from the scanning means is stored in a memory means, together with at least one piece of filing information which corresponds to the picture information and comprises a plurality of code groups (also referred to as retrieval sub-codes). When at least one of those codes in the plurality of code groups is designated by input means, at least one piece of the filing information is selected. The picture information corresponding to the retrieval information selected is retrieved and extracted from the memory means. The selected filing information thus obtained and the picture information corresponding to the filing information are displayed on a single display device in a predetermined manner.

BRIEF DESCRIPTION OF THE DRAWINGS

FIG. 2 is a block diagram of a detailed construction of the document information filing system shown in FIG. 1;

FIG. 5A shows an exmaple of a format of title information applied for the document information filing system shown in FIGS. 1 and 2;

FIG. 5B shows an example of a format of a retrieval code contained in the title information shown in FIG. 5A;

FIG. 6 shows a recording format of document picture information recorded in the magnetic tape shown in FIG. 4;

FIG. 8 shows a display by a cathode-ray tube shown in FIG. 2 which is provided in the document information filing system as an embodiment of the present invention;

FIG. 10 shows a display of a cathode-ray tube shown in FIG. 9.

DETAILED DESCRIPTION OF THE PREFERRED EMBODIMENTS

Figure 1:
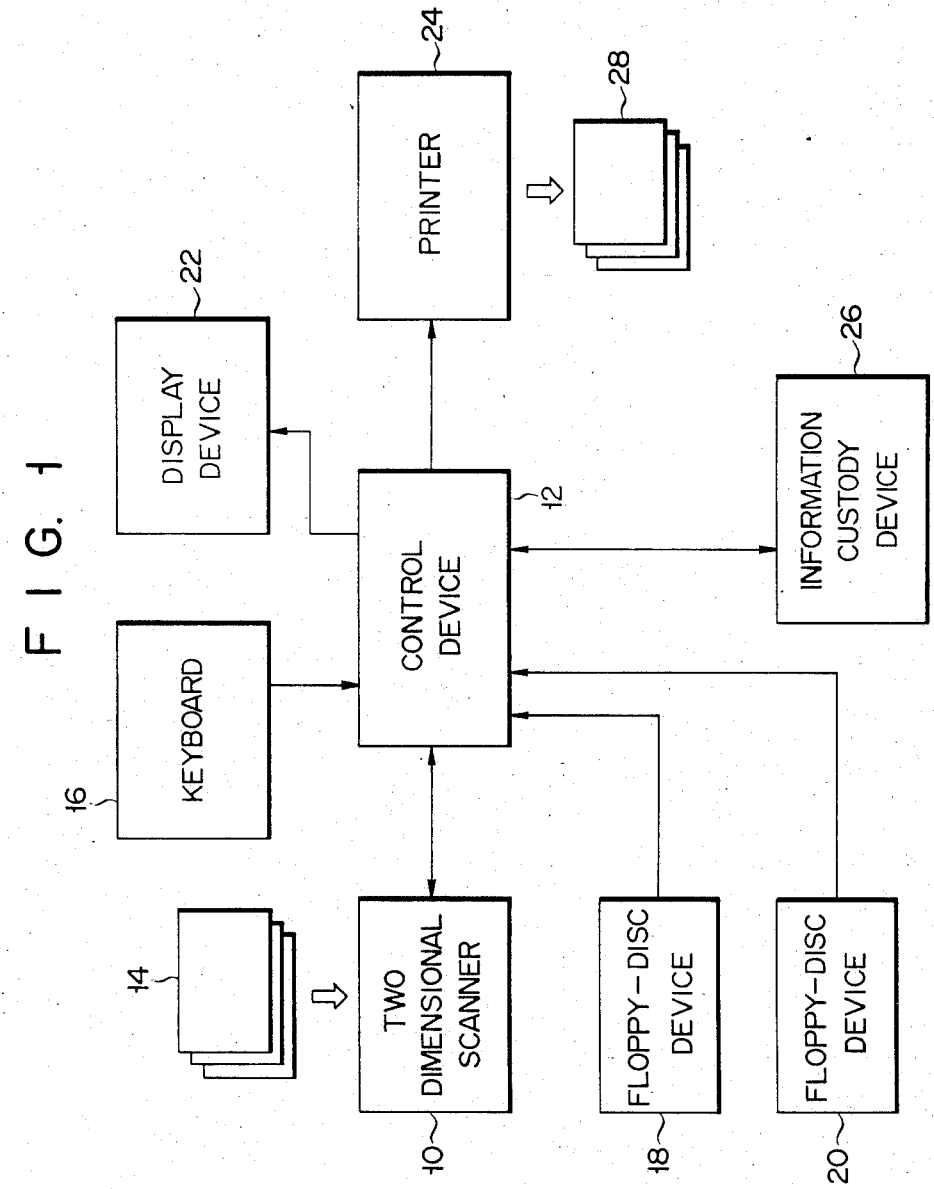
FIG. 1 shows a block diagram of an overall document information filing system which is an embodiment according to the present invention.

An overall arrangement of a document information filing system which is an embodiment according to the invention is illustrated in FIG. 1. A two-dimensional scanning device 10 is connected with a control device 12. When a document 14 to be filed is set in the two-dimensional scanning device 10, the document 14 is two-dimensionally scanned by a laser beam, for example. The contents of the document 14 scanned by the laser beam is photoelectric-converted by a known charge coupled device (referred to as a CCD) (not shown) provided in the two-dimensional scanner 10. An image signal (picture information) corresponding to the document image is produced from thw two-dimensional scanner 10 including the CCD. The two-dimensional scanner 10 is provided with a switch (not shown) for adjust two-valued levels from the CCD to proper levels in order to make more clear a change in an optical density of the document image.

Further connected to the control device 12 are an input device 16 which comprises a keyboard for example, and first and second floppy-disk devices 18 and 20. A floppy-disk (not shown) in which a predetermined control program is previously stores, is set in the first floppy-disk device 18. A floppy-disk (not shown) in which the information for administrating a plurality of magnetic tapes is set in the second floppy-disk device 20. The control device 12 operates in accordance with the input information transmitted from a keyboard 16 and the information produced from the first and second floppy-disk devices 18 and 20. The control device 12 controls various processing operations such as storing (filing), reproduction (retrieval and extracting), addition, insertion, deletion, etc. of the picture information such as document and the title information corresponding to the picture information.

Further connected to the control device 12 are a display device 22, a printer 24, and an information custody device 26 including magnetic tapes to be provided thereto which magnetically records the title information and the picture information on the magnetic tape for their custody. The display device 22 comprises known cathode-ray tube (referred to as a CRT). The display device 22 displays the title information keyed in the keyboard 16, picture information corresponding to the document 14 from the two-dimensional scanner 10, or the picture information supplied from the informaion custody device 26. Of those printing devices such as an electrostatic recording device, a thermal printer, a known ink ribbon impact printer and the like, an optical electronic copying machine is preferable for the printer, in order to realize a high precision printing. The electronic copying machine can provide a picture with 8 lines/mm of a resolution and a 3 second/A4 paper size of the printing speed, for example, by the scanning of the laser beam. The picture information transmitted from the scanner 10 and the picture information supplied from the picture information custody device 26 are printed on a given paper, thereby to form a called hard copy 28.

FIG. 2 shows a more detailed arrangement of the document information filing system shown in FIG. 1. A central processing unit (CPU) 30 is provided in the control device 12. Connected to the CPU 30 are two buses, e.g. a data bus 32 and an image bus 34. The information transfer is controlled by the CPU 30. The input device (key board) 16 and the floppy-disk devices 18 and 20 are connected to the data bus 32. The keyboard 16 is provided with normal keys (not shown) including numerical keys and character keys, and six function keys as well. The first key is a start key for starting the filing of the index information or for starting the scanning of an object to be recorded such as documents by the two-dimensional scanner 10. A second key 38 is a abolition key for abolishing the picture information recorded in a page buffer to be described later. A third key 40 is a record key when the picture information recorded in the page buffer is recorded into a magnetic tape of the information custody device 26. A fourth key 42 is a check key operated when the picture information recorded on the magnetic tape has no errors. A fifth key 44 is a deletion key operated when the picture information recorded on the magnetic tape is deleted. A sixth key 46 is a print key operated when a hard copy of the picture information recorded on the page buffer is desired. The two-dimensional scanner 10, the printer 24 and the information custody device 26 are coupled with both a data bus 32 and an image bus 34.

In the control device 12, there are a page buffer 50, a compression and extension circuit 52, a pattern generator 54 and a random access memory (RAM) 56. The page buffer 50 comprises a memory (not shown) connected to the data bus 32 and the image bus 34, which stored the picture information transmitted through the image bus 34 on each memory location corresponding to one page of the document. The compression and extension circuit 52, connected to the data bus 32 and the image bus 34, compresses and extends the picture information by a modified Huffman conversion (referred to as an MH conversion) or an inverted MH conversion. A pattern generator 54 converts an information signal (character information signal), which is generated by the keyboard 16 and supplied through the data bus 32 into a character pattern, and transmits the pattern to the image bus 34. The RAM 56, connected to the data bus 32, has a memory capacity capable of storing all the title information recorded in a single magnetic tape set in the information custody device 26. A character display controller 60 and an image display controller 62 are provided in the control device 12. The character display controller 60, containing a refresh memory (not shown), for example, serves to temporarily store a retrieval code which is included in the title information and supplied through the data bus 32, and to produce the same when desired. The image display controller 62, also containing a refresh memory (not shown), temporarily stored only the picture information supplied from the page buffer 50 through the image bus 34. The refresh memories have memory capacities corresponding to the entire picture area of the monitor CRT 22. In the character display controller 62, the character information (the retrieval information) selected on the basis of a condition set by the operator are successively supplied to the character display controller 60 and are allowed to be stored in the character display controller 60 up to number of the information to fill the screen of the CRT 22. This is true for the refresh memory of the image display controller 62. the output terminals of the character display controller 60 and the image display controller 62 are connected to gate circuit 64. Responsive to a reflex mode-assignment signal 65 outputted from the CPU 30, the gate circuit 64 operates to selectively supply to the CRT 22 the retrieval information from the character display controller 60 and the picture information from the image display controller 62. The gate circuit 64 is constructed to two AND networks and a signel OR network (not shown) combined in a known manner.

Figure 3:
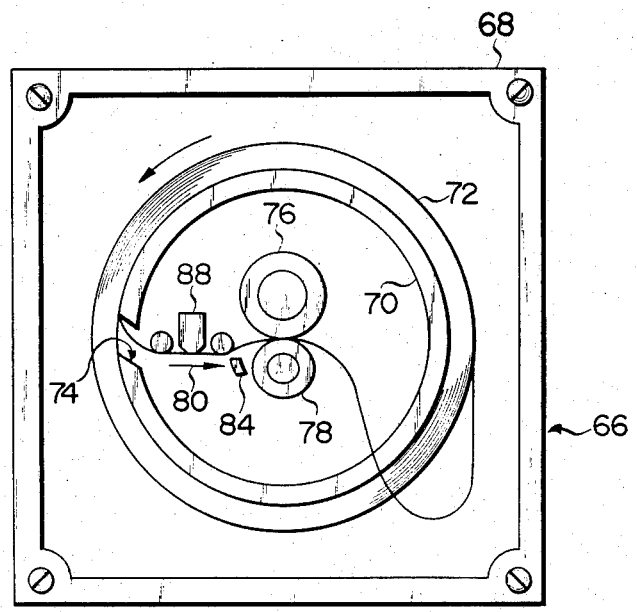
FIG. 3 shows a schematic diagram of a magnetic tape device set in an information custody device shown in FIG. 2.
Figure 4:
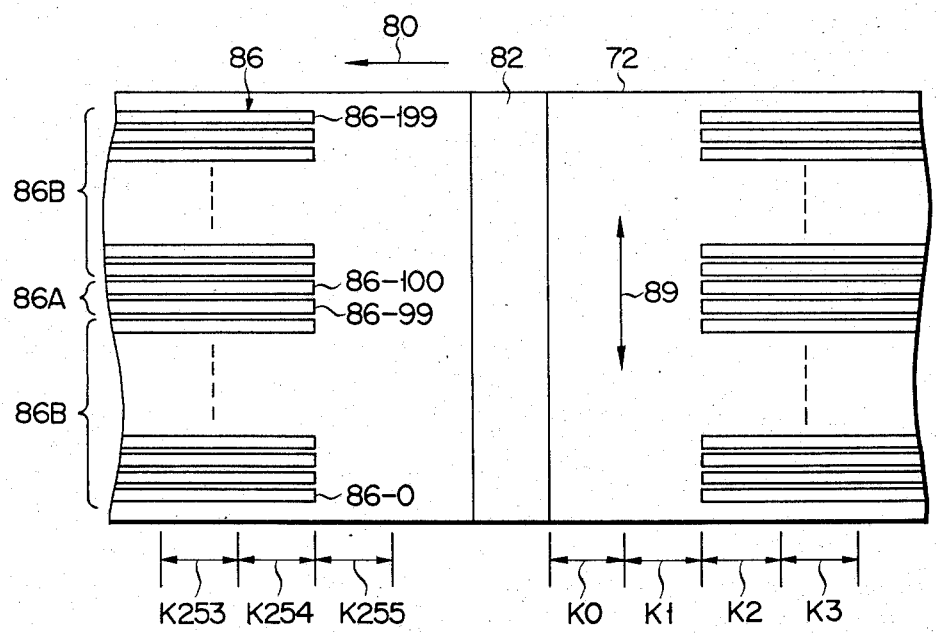
FIG. 4 shows an arrangement of recording tracks formed on a magnetic tape of the magnetic tape device shown in FIG. 3.

Turning now to FIG. 3, there are schematically shown a magnetic tape unit 66 removably loaded into the information custody device 26 and a tape transporting section for the magnetic tape unit 66. A fixed reel 70 is provided in a case 68. Around the periphery, a magnetic tape 72 of 0.5 inch (about 12.7 mm) in width and about 36 m in the full length is wound in a closed loop fashion or an endless fashion. After the magnetic tape unit 66 is loaded into the information custody device 26, a magnetic tape in directly contact with the outer periphery of the fixed reel 70 (innermost magnetic tape) is pulled out through a window 74 formed of the reel 70. The tape is transferred at a given high speed (e.g. 5 m/sec) in a running direction as indicated by an arrow 80 in a known manner with the assistance of a capstan 76 and a pinch roller 78. Then, the tape is returned to the outermost periphery portion of the magnetic tape 72 wound around the reel 70. Accordingly, the endless magnetic tape 72 is rotated once for about 7.2 sec. As shown in FIG. 4, a tape mark 82 of a thin metal strip is sticked to a portion where both the ends of the magnetic tape 72 are coupled with each other in closed loop fashion. An optical detector 84 is provided in the magnetic tape unit 66 shown in FIG. 3. Accordingly, the tape mark 82 is detected by the detector 84 every time the tape mark 82 of the magnetic tape 72 approaches to and passes the detector 84. Through the detection, a rotation number of the endless magnetic tape 72 is counted up. A detecting signal generated from the detector 84 when it detects the tape mark 82 is also used as a detection reference signal for detecting sector positions to be described later in this specification on the magnetic tape 72.

FIG. 4 illustrates a portion near the tape mark 82 of the endless magnetic tape 72. On the magnetic tape 72, 200 recording tracks are arranged in parallel in the longitudinal direction (the running direction) 80 of the tape. Each track has a width of about 40 μm and those are arranged with pitches each of about 52 μm. Those recording tracks 86 are numbered 0, 1, 2, ..., 198, 199 from the lowermost track. Thus, a track number 0 is given to the lowermost recording track 86-0 and a track number 199 is given to the uppermost track 86-199. The title information determined corresponding to one piece of the picture information are recorded on two recording tracks 86-99 and 86-100 located at the substantially center band of those recording tracks 86. One of those tracks, for example, a track 86-99, is used as a spare track. The other recording tracks than the title information recording tracks 86-99 and 86-100 are recorded as the picture information such as documents. the title information comprises the retrieval code and the index information representing recording addresses on the magnetic tape 72. The recording address comprises a track address indicating of track number and a sector address indicating of sector number. the title information recording tracks 86-99 and 86-100 of those recording tracks are generally shown by 86A and the remaing picture information recording tracks are indicated by 86B, for ease of illustration.

The recording track 86 is divided into 256 areas (referred to as sectors) K0, K1, ... K254, K255 arranged in the longitudinal direction fo the magnetic tape 72 in a series fashion, as similarly shown in FIG. 3. those sectors are sequentially numbered 0, 1, 2, ..., 254, 255 with reference to the tape mark 82. Accordingly, by designating the track number and the sector number, an address of desired picture information recorded on the magnetic tape 72 is directly determined. When the memory location or address on the magnetic tape 72 for the desired picture information is specified, a record/reproduction head 88 shown in FIG. 3, is reciprocately moved on the order of micron in a direction 89 normal to the tape running direction 80 by means of a head access mechanism (not shown). Through the head traveling, any desired recording track is selected.

The arrangement of the title information as mentioned above will be described in detail. The title information comprises four kinds of information components, for example. The document information filing system as an embodiment of the present invention is applicable for the custody and retrieval of various information recording mediums containing the informtion regarding real estate, library information, etc, in addition to the filing of a great amount of documents produced in the offices or the like. Therefore, the title information may flexibly be set in accordance with the kinds of the information transferring medium to which the filing system is applied.

FIG. 5A shows a model of the title information applied for the custody and retrieval of the documents produced in the offices. The title information is recorded on the title information recording track 86A of the magnetic tape 72 shown in FIG. 4. The title information comprises four sections, as mentioned above. A first section 90 is a retrieval code representing generally the contents of the document to be filed, which is set by an operator. A second section 92 is an address code representing a recording address code including a track number and a sector number of the recording track on which the picture information corresponding to the retrieval code are recorded. A third section 94 is a code representing a length of the picture information, that is, a picture length over which the data corresponding to the number of sectors required for recording the picture information should be recorded. A fourth section 96 is a delete or deletion code representing whether the picture information corresponding to the retrieval code should be deleted or not. Those second to fourth codes make up the above-mentioned index information 98. For filing documents produced in offices such as technical documents produced in a company having a plurality of technical developing divisions, the retrieval code contained in the title information is made up of subcodes of six, for example, as shown in FIG. 5B. A first subcode is a document code. Contained in the documents to be filed are research papers, experiment reports, search reports, drafts, production technology reports, and the like. Codes of two or three digits are prepared for these documents, respectively, and a code corresponding to the kind of the document to be filed is recorded as a first subcode to one the recording track 86A. An administration number attached to the document is used as a second subcode. A third subcode is a division code for indicating a division to which the document to be filed belongs. A fourth subcode is a person code for indicating a research worker who prepares the document to be filed. A fifth subcode is a date code which indicates a date of the issuance of the doument to be recorded. A sixth subcode is a technical field code to which the document in question belongs.

FIG. 6 shows a recording format of the picture information recorded on a given track, e.g. a track 86-0, of the picture information recording track 86B of the magnetic tape 72 (FIGS. 3 and 4). The picture information 100 of one document are recorded on the magnetic tape over a plurality of sectors, for example, the sectors K1 to K253. In this case, a length L of the picture information is expressed by the number of the track sectors used and hence L=253.

The operation of the document information filing system thus constructed, which is an embodiment according to the present invention, will be described. The operation of the system includes a record (filing) mode and a reproduction (retrieval) mode.

A case that a desired document is filed in the filing system will first be given. In FIG. 2, the filing system is set ot the filing mode through the operation fo the keyboard 16 in FIG. 2. The retrieval code corresponding to the document which is contained in the title information and made up of six subcodes is prepared and keyed in by the operation of the keyboard 16. When the start key 36 on the keyboard 16 is depressed, the CPU 30 in the control device 12 checks the correctness of the retrieval code keyed in by the operator, on the basis of a format for preparing the retrieval code, which is previously defined. The CPU 30 inspects that the retrieval code inputted by the operator is not coincident with any retrieval code of the filed retrieval codes, in order to prevent or inhibit a double file. After the inspection by the CPU 30, when the retrieval code inputted is correct, the retrieval code is transferred through the data bus 32 to the RAM 56 and stored therein. As the result of the inspection, the retrieval code inputted by the operator is incorrect, this is informed to the operator in a known manner. Then, the operator operates again the keyboard 16 to input a correct retrieval code from the keyboard 16.

After the completion of the inputting of the retrieval code, a document to be filed is set in the two-dimensional scanner 10. When the keyboard 16 is operated, the CPU 30 starts the operations of the two-dimensional scanner 10 and the information custody device 26 containing the magnetic tape unit 66 (FIG. 3). The document set in the scanner 10 is two-dimensionally scanned and photoelectric-converted by the scanner 10. the two-dimensional scanner 10 produces one scanning line information of the picture information of the document and the line information are sequentially stored in the page buffer 50. After the completion of recording the picture information corresponding to one page of the document set in the scanner 10, the picture information is stored through the image bus 34 to the refresh memory (not shown) in the image display controller 62. The picture information is transferred to the CRT 22, through the gate circuit 64 operating in response to a reflex mode-designating signal 65 supplied from the CPU 30 and is visualized by the CRT 22. Upon seeing the display on the CRT 22, the operator can inspect whether the document to be filed is correctly filed or not in the present filing system. When the result of the inspection provides an unsatisfactory picture such as folding down of the document, improper optical density of the document, improper levels of the two-valued levels of the two-dimensional scanner 10, and the like, the abolition key 38 on the keyboard 16 is operated. Through the operation of the image display controller 62, the contents of the refresh memory (not shown) contained in the image display controller 62 is erased. Then, the operator operates again the filing system to file a correct and satisfactory image.

After inspecting the picture on the CRT 22 and checking the document under file is correctly inputted into the filing system, the operator operates the record key 40 provided on the keyboard 16. The picture information stored in the page buffer 50 (FIG. 2) is transferred to the compression/extension circuit 52 every line information in accordance with the control of the CPU 30. The picture information every line information is carried out the band-compression by the compression/extension circuit 52 (FIG. 2) in accordance with the MH conversion and is supplied to the head 88 (FIG. 3) of the information custody device 26. The picture information band-compressed is magnetically recorded on a given track contained in the picture information recording track 86B of the magnetic tape by means of the head 88. When the record or file of the document is completed, the picture information (the band-compressed picture information) is read out under control of the CPU 30 and is transferred to the compression/extension circuit 52 every one scanning line information. The picture information is extended in accordance with the inverted MH conversion by the circuit 52 and then is supplied to the page buffer 50. When the picture information to be reproduced corresponding to one page is stored in the page buffer 50, then the picture information is stored in the refresh memory of the image display controller 62. During this period, the CPU 30 sets the address code and the picture length code (and the delation code) other than the retrieval code prepared by the operator in the filing system. These information are stored in the RAM 56 corresponding to the retrieval code. The title information comprised of those pieces of the information are recorded on a given location of the title information recording track 86B.

Figure 7:
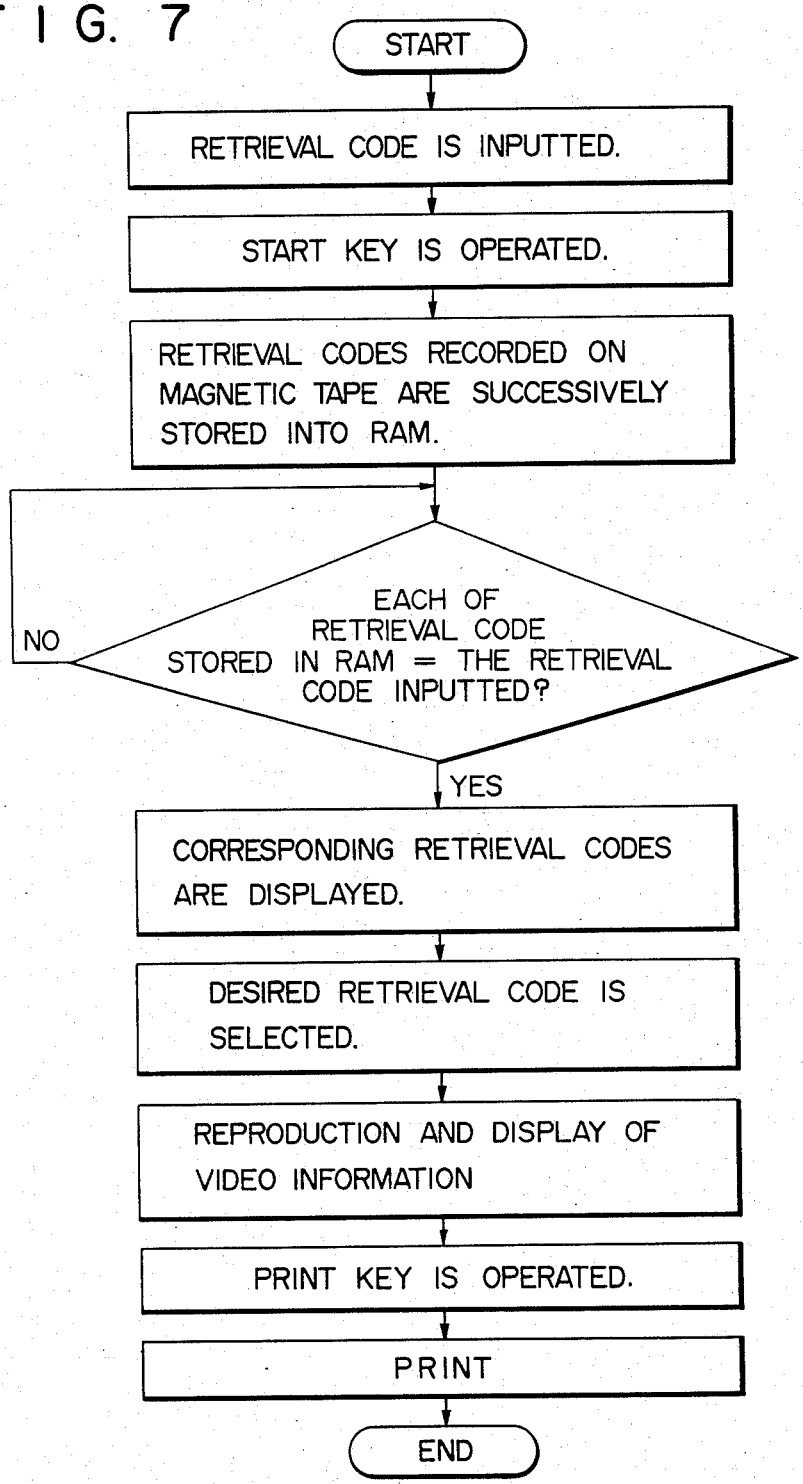
FIG. 7 shows a retrieval procedure of the document information filing system according to the invention shown in FIGS. 1 and 2.

A case to retrieve desired information from those pieces of the picture information (also called video information) recorded as mentioned above will be described. In aiding of understanding the present case, there is illustrated a flow chart describing the retrieval information in FIG. 7.

The operator, when the document to be retrieved is known, operates the keyboard 16 to input a retrieval code corresponding to the document into the filing system. According to the above-mentioned case, the operator operates the keyboard 16 to input into the filing system all the six subcodes, the document code, the administration code, the division code, the person code, the data code, and the technical field code. On the other hand, there is a case that the document to be retrieved is unknown but a document to satisfy a given condition is retrieved at random. For example, when a research paper relating to a specific technical field is desired, only the technical field code and the document code of those subcodes constituting the retrieval code are inputted into the present filing system. When the start key 36 on the keyboard 16 is operated, the magnetic tape 72 provided in the information custody device 36 is traveled under control of the CPU 30 and the head 88 is moved up to a given location to reproduce the title information recording track 86A. The retrieval codes contained in the title information recorded in the title information recording track 86A are all reproduced by the head 88 and stored in the RAM 56. The CPU 30 verifies if the retrieval codes stored in the RAM 56 are coincident with the retrieval condition set by the operator. Only the code coincident with the retrieval condition (referred to as a "selected code") is permitted to be transferred to the character display controller 60. When the verification by the CPU 30 terminates and all the "selected codes" coincident with the retrieval condition specified by the operator are stored into the refresh memory of the character display controller 60, the "selected retrieval codes" are displayed on the CRT 22 through the character display controller 60 and the gate circuit 64, as shown in FIG. 8, for example.

When a paper written by Mr. Yamamoto belonging to the semiconductor division, after seeing the display screen of the CRT 22 shown in FIG. 8, is desired, the operator operates the keyboard 16 and inputs a retrieval code corresponding to the above paper. Then, the title information including the retrieval code corresponding to the picture information of the desired paper is reproduced from the recording track 86A of the endless magnetic tape 72 under control of the CPU 30. On the basis of an address code 90 and a picture code 92 included in the title information, a position of the head 88 is moved. When the head 88 is located at a specified area of the recording track 86B where the picture information corresponding to the desired paper is stored, the tape 72 is driven to reproduce the picture information of the desired paper. The reproduced picture information (band-compressed information) is supplied to the compression and extension circuit 52 every scanning line information under the control of the CPU 30. The picture is sequentially supplied to the page buffer 50 after being band-extended by the MH conversion. When all the picture information of one page are completely stored into the buffer 50, the information are transferred to the image display controller 62 through the image bus 34. At this time, the gate circuit 64, responding to the reflex mode-assignment signal 65 supplied from the CPU 30, operates to allow the output of the image display controller 62 to be transferred to the CRT 22 via the gate circuit 64 and displayed by the CRT 22. In other words, the character information (retrieval code information) outputted from the character display controller 60 and the picture information outputted from the image display controller 62 are selectively transferred to the CRT 22 by the gate circuit 64. Therefore, both the character information and the picture information can be selectively displayed by the single CRT 22. Further, when the operator wants again to refer to a list of the retrieval codes about the other papers after seeing the picture signal corresponding to the paper, the gate circuit 64 is again switched, and the output of the character display controller 60 is transferred to the CRT 22 once more. Therefore, the operator can easily see the character information and the picture information alternately in a short period. Since only one CRT is enough for the document information filing system, the manufacturing costs of the filing system could be reduced, with the system looking smart.

Figure 9:
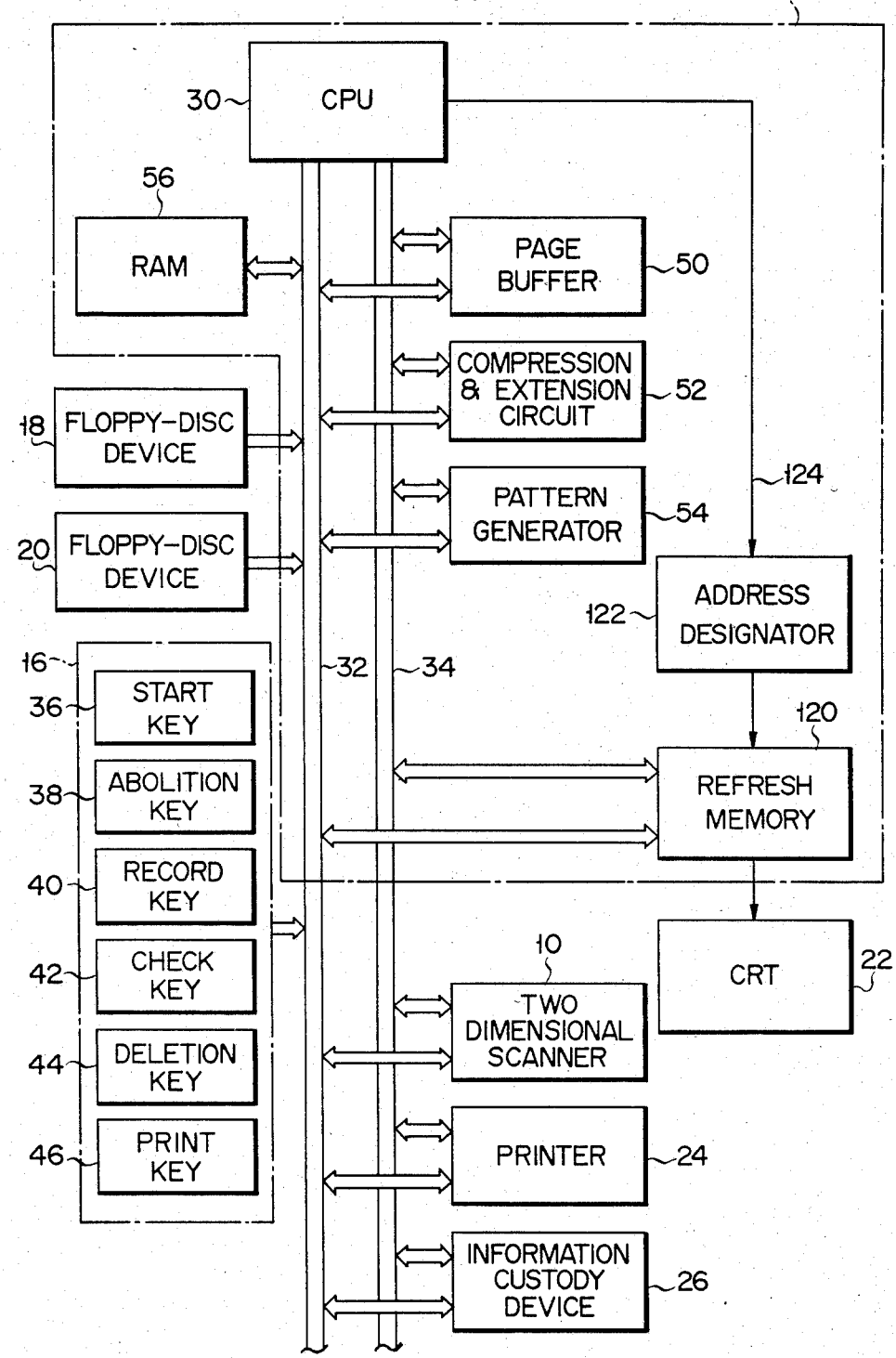
FIG. 9 shows a block diagram showing an arrangement of another embodiment of a document information filing system according to the present invention.

In FIG. 9, a document information filing system which is another embodiment of the present invention is shown. The same portions as those of the filing system shown in FIG. 2 are shown by like reference numerals and the explanation of those will be omitted. A refresh memory 120 is provided in the control device 12. The memroy 120 is connected to a data bus 32 and an image bus 34, both being connected to the CPU 30. An output terminal of the refresh memory 120 is connected to a single monitor CRT 22. Reference numeral 122 designates an address designator. The address designator 122 is connected to the refresh memory 120 and is operated in response to a control signal 124 supplied from the CPU 30. The address designator directly designates what memory area in the refresh memory 120 into which the information inputted to the refresh memory 120 is to be stored according to its kind.

The refresh memory 120 has a memory capacity corresponding to the screen of the CRT 22, and the capacity is set at 1000 bits in a row direction, 700 bits in a column direction, for example. In the retrieval mode, the retrieval code (character information) which is converted into a character pattern by the pattern generator 54 is stored in one side of the memory areas (a first area) having an about half memory capacity of the refresh memory 120. To be more specific, when the character information is produced form the pattern generator 54, the CPU 30 supplies a control signal 124 to the address designator 122. In response to the control signal 124, the address designator 122 works to store the inputted character information into the first area of the refresh memory 120. Meanwhile, the picture information corresponding to the document which the operator desires and is read out from the page buffer 50 is stored in the remaining are (a second area) of the refresh memory 120 by the address designator 122.

Accoridng to another embodiment of the present invention thus constructed, the character information of the retrieval code and the picture information of the document are stored in the first and second areas of the refresh memory, respectively. Accordingly, the two kinds of the information can be simultaneously displayed on the CRT 22 as shown in FIG. 10. In FIG. 10, the operator can select a desirable document, while seeing the "selected retrieval code" displayed in the left half area 130 of the screen of the CRT 22, and at the same time he can see the picture information corresponding to the document on the right half area 132. As a result, the operator can retrieve a desirable document from the documents filed in the filing system more easily.

Although the present invention has been shown and described with respect to particular embodiments, nevertheless, various changes and modifications which are obvious to a person skilled in the art ot which the invention pertains are deemed to lie within the spirit, scope, and comtemplation of the invention. For example, in the embodiment shown in FIG. 9, the character information and the picture information are stored in the first and the second areas of the refresh memory 120, respectively, in order to display both the information simultaneously. The present invention, however, is not limited to this embodiment. The memory area of the page buffer 50 may be halved and the above two kinds of the information are stored in the halved areas, respectively.

What is claimed is:

1. A document filing system comprising:
   optical scanning means for scanning a plurality of documents randomly input thereto to produce document picture information;
   means for receiving and associating with each document a retrieval character code which is determined as a function of classification parameters, each retrieval code including a predetermined parameters, each retrieval code including a predetermined number of subcodes;
   memory means for storing a plurality of pieces of said document picture information and a plurality of retrieval codes corresponding thereto, each retrieval code including a predetermined number of subcodes;
   a display device having a display screen bisected into a first display region for exclusively displaying retrieval code data and a second display region for exclusively displaying the document picture image;
   retrieval code input means, manually operable by an operator, for specifying at least a portion of the retrieval character code; and
   retrieval controller means for, when a retrieval code is at least partially specified by an operator designating one or more subcodes thereof, (a) extracting from said memory means all of those retrieval codes which include the specified subcodes as a part thereof and the corresponding pieces of document picture information, in accordance with a predetermined algorithm, (b) causing said display device to exclusively display a list of the extracted retrieval codes on said first display region ot allow the operator to select a desired document while seeing the retrieval code list, said retrieval controller means, when the operator inputs the remaining subcode or subcodes through said input means to specify a certain document, causing said display device to display a picture information of the specified document on the second display region and to continuously display said retrieval code list on the first display region, whereby, after referring to the presently displayed document picture image, the operator may select another document from those satisfying the operator's earlier partial specification based on the retrieval codes continuously displayed on said first display region, thereby facilitating the operator to find his finally desired document whose picture information will be displayed on the second display region of said display device.

2. A document filing system according to claim 1, wherein said screen of said display device is laterally divided into left and right half areas which respectively serve as said first and second display regions and which are substantially equal in size to each other.

3. A document filing system according to claim 1, wherein said memory means includes a recording medium on which said picture information and said retrieval codes are recorded.

4. A system according to claim 1 further comprising printing means for preparing a hard copy of information displayed by said display means.

5. A system according to claim 1 wherein said memory means comprises a magnetic tape.

6. A system according to claim 1 wherein said magnetic tape comprises a continuous loop magnetic tape.

7. A system according to claim 1 wherein said memory means comprsies a magnetic disk.

8. A system according to claim 1 wherein said magnetic disk comprises a floppy disk.

9. A document filing system according to claim 1 wherein said retrieval controller means comprises:
first display control means for temporarily storing a retrieval code designated for viewing, and outputting it at a predetermined time;
second display control means for temporarily storing picture information for a document corresponding to the designated retrieval code; and
gate means, connected to said first and second control means, for selectively transferring said retrieval code and picture information to said display means.

10. A system according to claim 1 further comprising means for controlling an operational mode of said system.

11. A system according to claim 10 wherein said mode controlling means causes said system to operate in one of the following operational modes:
(1) a storing mode wherein document information is stored in said memory means,
(2) a reproduction mode wherein document information is retrieved from said memory means and displayed, and
(3) an addition/insertion/deletion mode wherein previously stored information is altered.

12. A document information filing system according to claim 1 wherein said retrieval controller means comprises refresh memory means for exclusively storing said retrieval codes in a first memory region thereof having substantially half the total memory capacity thereof and exclusively storing information of a single document picture in a second memory region having substantially half the total memory capacity thereof.

13. A document information filing system according to claim 12 wherein said display device comprises a single cathode ray tube (CRT) display.

14. A document information filing system according to claim 13 wherein said retrieval controller means comprises address designator means, connected to said refresh memory means and to said retrieval code input means, for receiving electrical character code signals originally generated by said retrieval code input means to represent the retrieval codes designated by the operator and for executing memory addressing to store said character code signals in said first memory region of said refresh memory means.

* * * * *